Aug. 26, 1947. N. A. ANDERSSON 2,426,481

TANK WAGON WELDED IN ONE PIECE

Filed Nov. 30, 1943

Nils Albin Andersson
INVENTOR

Patented Aug. 26, 1947

2,426,481

UNITED STATES PATENT OFFICE 2,426,481

TANK WAGON WELDED IN ONE PIECE

Nils Albin Andersson, Alsten, Sweden, assignor to A/B Chr. Olsson, Värtan, Sweden Application November 30, 1943, Serial No. 512,403
In Sweden July 31, 1941

4 Claims. (Cl. 105—358)

In tank wagons welded in one piece the tank itself is welded to the chassis by means of welded joints extending along the cylindrical tank, said joints being in the transmission of the buffer stresses, subjected to buffing as well as draft stresses. As a rule, the buffing stresses act at the inner end of the welded joint, while the draft stresses arise at that end of the joint which is next to the end of the tank. In order to carry the tank there are used side plates on which the welded joints are provided. Any number of baffle plates may be provided in the usual manner within the tank.

The present invention relates to a device for absorbing the abovementioned buffing and draft stresses, and consists chiefly in that each side plate is extended so far, that its end point is situated about right before or in the vicinity of a baffle plate. Further, on the outside of the tank at each side plate there are welded preferably two transverse plates. Moreover, a triangular plate may be mounted within the tank close to the respective baffle plate to provide a construction suitable for absorbing the buffing stresses arising at the end of the welded joints. At the other end of each welded joint there may be provided corner plates against the end of the tank by which plates the draft stresses acting there may be absorbed.

Figure 1:
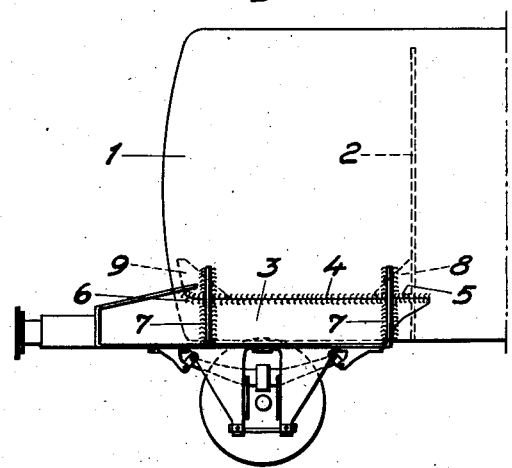
Figure 2:
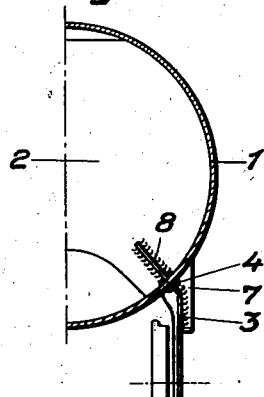
Figure 3:
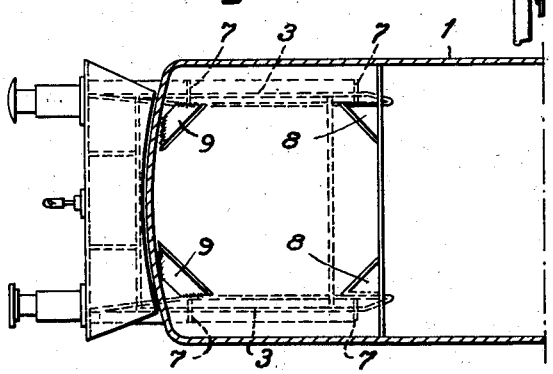

An embodiment of the invention is illustrated on the accompanying drawing, in which Fig. 1 shows part of the tank wagon viewed from the side, Fig. 2 a vertical section through the wagon, and Fig. 3 is a plan section of one end of a tank car according to the invention.

The tank consists of a cylindrical shell 1 which internally is provided with a suitable number of baffle plates 2 and which serves as an interframe extending between trucks. At each end the tank rests on two side plates 3 with which the tank is connected by a welded joint 4 and which serve as axle box mountings. The buffers are carried by a frame of which the side plates 3 form parts. Thus, the buffer stresses will be transmitted to the tank through the said welded joints and consequently buffing stresses arise at the inner end 5 of each welded joint while draft stresses arise at the end 6 of the respective joint located next to the respective end of the tank. In order to correctly absorb the said stresses each side plate 3 is according to the invention extended so far that the point 5 will be situated right before or close to a baffle plate 2. Moreover, two transverse plates 7 are welded on to the respective side plate 3 and the outer side of the tank 1, and a triangular plate 8 disposed in the radial plane containing the joint between plate 3 and shell 1 has one of its edges welded to the inside of the tank shell and a second edge to the baffle plate 2. Further, in order to absorb the pulling stresses active at 6, triangular corner plates 9, similar to the plates 8, may be welded on within the tank.

The described device affords the advantage of a sturdy construction which is well adapted to absorb the buffing and draft stresses arising through the transmission of the buffer stresses to the tank.

Having now described my invention, what I claim as new and desire to secure by Letters Patent is:

1. A tank wagon comprising a plurality of trucks, a cylindrical shell serving as interframe between trucks and including a plurality of transverse baffle plates, and a pair of parallel side plates at each end of said shell to carry said shell, said side plates serving as axle box mountings and forming parts of buffer carrying frames, each side plate terminating in the vicinity of one of said baffle plates and being welded along one of its longitudinal edges to the outside of said shell on a line parallel to the axis of the latter.

2. A tank wagon, as claimed in claim 1, comprising for each side plate two transverse plates each welded with one of its edges to the outside of the corresponding side plate and of said shell.

3. A tank wagon, as claimed in claim 1, comprising for each side plate a triangular plate arranged inside of said shell in a radial plane containing the joint between the corresponding side plate and said shell, each triangular plate having one of its edges welded to the inside of the shell and a second edge to the adjacent baffle plate.

4. A tank wagon, as claimed in claim 1, comprising for each side plate a triangular corner plate arranged inside of said shell in a radial plane containing the joint between the corresponding side plate and said shell, each of said corner plates having one of its edges welded to the inside of the shell envelope and another edge to the inside of the corresponding end wall of the shell.

NILS ALBIN ANDERSSON.

REFERENCES CITED

The following references are of record in the file of this patent:

UNITED STATES PATENTS

| Number | Name | Date |
|---|---|---|
| 1,769,490 | Casey et al. | July 1, 1930 |
| 738,261 | Van Dyke | Sept. 8, 1903 |
| 1,859,338 | Murphy | May 24, 1932 |
| 2,239,507 | Pierce | Apr. 22, 1941 |

FOREIGN PATENTS

| Number | Country | Date |
|---|---|---|
| 338,343 | Italy | Mar. 31, 1936 |